(12) United States Patent
Duan et al.

(10) Patent No.: US 8,551,360 B2
(45) Date of Patent: Oct. 8, 2013

(54) RARE-EARTH DOPED ALKALINE-EARTH SILICON NITRIDE PHOSPHOR, METHOD FOR PRODUCING AND RADIATION CONVERTING DEVICE COMPRISING SUCH A PHOSPHOR

(75) Inventors: Cheng-Jun Duan, Bad Salzungen (DE); Hubertus Theresia Hitzen, Eindhoven (NL); Sylke Rösler, Eisenach (DE); Detlef Starick, Grelfewald (DE); Sven Rösler, Eisenach (DE); Anne Charlotte Antoinette Delsing, Eindhoven (NL)

(73) Assignees: Leuchtstoffwerk Breitungen GmbH (DE); Ledon Lighting Jennersdorf GmbH (AT)

( * ) Notice: Subject to any disclaimer, the term of this patent is extended or adjusted under 35 U.S.C. 154(b) by 564 days.

(21) Appl. No.: 12/738,213

(22) PCT Filed: Oct. 14, 2008

(86) PCT No.: PCT/EP2008/063810
§ 371 (c)(1),
(2), (4) Date: Apr. 15, 2010

(87) PCT Pub. No.: WO2009/050171
PCT Pub. Date: Apr. 23, 2009

(65) Prior Publication Data
US 2010/0288972 A1    Nov. 18, 2010

(30) Foreign Application Priority Data
Oct. 15, 2007   (EP) .................................. 07118436

(51) Int. Cl.
*C09K 11/08*    (2006.01)
*C09K 11/66*    (2006.01)
*C09K 11/02*    (2006.01)
*C09K 11/77*    (2006.01)

(52) U.S. Cl.
USPC .............................. 252/301.4 F; 252/301.4 R

(58) Field of Classification Search
USPC ...................... 252/301.4 R, 301.4 F
See application file for complete search history.

(56) References Cited

U.S. PATENT DOCUMENTS

| 2007/0114548 | A1  | 5/2007 | Setlur et al. |
| 2008/0081011 | A1* | 4/2008 | Oshio .......................... 423/263 |
| 2009/0066230 | A1  | 3/2009 | Hirosaki et al. |

FOREIGN PATENT DOCUMENTS

| EP | 1104799     | 6/2001 |
| WO | 2004/055920 | 7/2004 |
| WO | 2005/083037 | 9/2005 |
| WO | 2006/126567 | 11/2006 |

OTHER PUBLICATIONS

Li. Structure and luminescence properties of novel rare-earth doped silicon nitride based materials. Thesis Universiteit Eindhoven, 2005.*

* cited by examiner

*Primary Examiner* — Carol M Koslow
*Assistant Examiner* — Matthew E Hoban
(74) *Attorney, Agent, or Firm* — Mark D. Wieczorek, Esq.; Mayer & Williams, PC

(57) ABSTRACT

The invention relates to a method of manufacturing a rare-earth doped alkaline-earth silicon nitride phosphor of a stoichiometric composition. Said method comprising the step of selecting one or more compounds each comprising at least one element of the group comprising the rare-earth elements (RE), the alkaline-earth elements (AE), silicon (Si) and nitrogen (N) and together comprising the necessary elements to form the rare-earth doped alkaline-earth silicon nitride phosphor ($AE_2Si_5N_8$:RE). The method further comprises the step of bringing the compounds in reaction at an elevated temperature in reaction for forming the rare-earth doped alkaline-earth silicon nitride phosphor ($AE_2Si_5N_8$:RE). In such a method normally a small amount of oxygen, whether intentionally or not-intentionally added, will be incorporated in the rare-earth doped alkaline-earth silicon nitride phosphor ($AE_2Si_5N_8$:RE). According to the invention the creation of defects by formation of a non-stoichiometric oxygen containing phosphor is at least partly prevented by partly substituting for the ions (AE, Si, N) of the alkaline-earth silicon nitride phosphor ($AE_2Si_5N_8$:RE) suitable further elements of the periodic system by which vacancies are created, filled or annihilated resulting in the formation of a modified alkaline-earth silicon nitride phosphor ($AE_2Si_5N_8$:RE) having a stoichiometric composition. In this way a modified phosphor is obtained having excellent and stable optical properties. The invention further relates to a modified phosphor obtainable by the above-mentioned method and a radiation converting device comprising such a phosphor.

14 Claims, No Drawings

RARE-EARTH DOPED ALKALINE-EARTH SILICON NITRIDE PHOSPHOR, METHOD FOR PRODUCING AND RADIATION CONVERTING DEVICE COMPRISING SUCH A PHOSPHOR

FIELD OF THE INVENTION

This invention relates to a method of manufacturing a rare-earth doped alkaline-earth silicon nitride phosphor. Said method comprising the step of selecting one or more compounds each comprising at least one element of the group comprising the rare-earths elements (RE), the alkaline-earth elements (AE), silicon (Si) and nitrogen (N) and together comprising the necessary elements to form the rare-earth doped alkaline-earth silicon nitride phosphor ($AE_2Si_5N_8$:RE). A further step of the method is bringing the compounds at an elevated temperature in reaction for forming the rare-earth doped alkaline-earth silicon nitride phosphor ($AE_2Si_5N_8$:RE), whereby a small amount of oxygen, whether intentionally or not-intentionally added, being incorporated in the formed rare-earth doped alkaline-earth silicon nitride phosphor ($AE_2Si_5N_8$:RE). Such silicon nitride based phosphors form phosphors with improved chemical composition and optical properties. Such rare-earth doped silicon nitride based materials strongly absorb UV-blue light and convert it efficiently into yellow-orange-red light, and therefore they can be used as a phosphor for light sources and displays, especially for Light Emitting Diodes (LED) and Scanning Beam Displays (as it is described e.g. in WO 2007/131195) working with UV and purple laser as exciting source, as well as radiation converter in other devices. The invention further relates to a phosphor obtainable by such a method and to a radiation converting device comprising such a phosphor.

BACKGROUND OF THE INVENTION

A method of the kind mentioned in the opening paragraph is known from EP 1 104 799 A1. It is described how in this way e.g. $Eu^{2+}$-doped $M_2Si_5N_8$ (M=Ca, Sr, Ba) is manufactured that strongly absorbs UV-blue radiation and converts this absorbed radiation efficiently into red light.

A drawback of the known method is that the conversion efficiency of the phosphors obtained by said method is not satisfying. Moreover, the conversion efficiency drops due to degradation of the phosphor.

OBJECT AND SUMMARY OF THE INVENTION

For that reason the present invention aims at providing a method of manufacturing providing a phosphor with still higher conversion efficiency and an excellent life-time.

According to the invention that aim is reached in a method according to claim 1.

The invention is based on the conclusion that unsatisfactory properties of the above-mentioned known phosphors result from the creation of defects by formation of a non-stoichiometric oxygen containing phosphor. Besides the steps mentioned in the opening paragraphs the inventive method is characterized in that the creation of defects by formation of a non-stoichiometric oxygen containing phosphor is at least partly prevented by partly substituting for the ions (AE, Si, N) of the alkaline-earth silicon nitride phosphor ($AE_2Si_5N_8$:RE) suitable further elements of the periodic system by which vacancies are created, filled or annihilated resulting in the formation of a modified alkaline-earth silicon nitride phosphor $AE_2Si_5N_8$:RE having a stoichiometric composition. In this way a modified phosphor is obtained with excellent optical luminescence properties like the spectral distribution of the converted radiation but with in particular a very high conversion efficiency and very moderate degradation behavior.

The present invention is based on the following surprising recognitions. Firstly the inventor realized that small amounts of oxygen are intentionally or un-intentionally added in the starting materials or during the manufacturing process. An example of the first is the addition of small amounts of europium oxide ($Eu_2O_3$) to the compounds used for forming the phosphor. Although the firing of said compounds to obtain the phosphor normally is performed under a reducing ambient of e.g. a mixture of nitrogen and hydrogen, the inventor realized that not all the oxide thus added is removed. Moreover, un-intentional addition of oxygen can occur since the pure starting materials may contain oxide impurities that are not completely or even not at all removed during the manufacturing. An example of such an impurity is silicon dioxide ($SiO_2$) that may be present in various amounts in a starting material like silicon nitride ($Si_3N_4$). A second recognition is that the presence of oxygen may lead to formation of a non-stoichiometric compound on the phosphor crystal lattice of the nitrido silicate type comprising corner-sharing $SiN_4$ tetraeders and having various crystal structures like the monoclinic or orthorhombic structures. This may be indicated by the following formula:

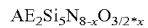

$$AE_2Si_5N_{8-x}O_{3/2*x}$$

This equation shows that if a fraction x of the nitrogen ions is replaced by oxygen ions, the resulting compound must contain 3/2*x Oxygen atoms in order to obtain charge-neutrality. Whereas only a fraction x is available for positioning O ions on N sites the remaining 1/2*x O atoms have to be positioned elsewhere. This may be e.g. in the form of an interstitial (1/2) oxygen atom. Such a defect will influence the conversion efficiency in negative manner and also may enhance degradation of the phosphor.

Creation of an anion vacancy in the phosphor crystal lattice can be used according to the invention to avoid the formation of such an interstitial oxygen defect in a manner that will be discussed below.

More likely however at least a part of the superfluous oxygen atoms are positioned on an N ion position in an additional unit cell. However, for reasons of charge neutrality this anion interstitial defect is equivalent to the creation of a cation vacancy on the cation sublattice that also has the above negative effects on the phosphor properties.

Furthermore, the invention is based on the recognition that by substituting suitable elements of the periodic system for the ions forming the (rare-earth doped) alkaline-earth silicon nitride phosphor, said defects can be avoided by creating, filling or annihilating vacancies. Moreover, with the method of the present invention also segregation of the phosphor into two or more compounds is substantially prevented. Such segregation also is detrimental for the conversion efficiency and the degradation behavior of the phosphor. Thus, with a method according to the invention a phosphor with a very high efficiency is obtained since the number of defects such as interstitials and vacancies that will act as centers for non-radiative recombination and the possibility of segregation is reduced. At the same time degradation behavior of the phosphor is improved.

In a first preferred embodiment of the method according to the invention the suitable further elements form cations for partial replacement of alkaline-earth cations (AE) or silicon cations (Si) and having a lower positive charge than the cation that they replace. In this way for the same total positive charge a larger number of cations is required and the cation vacancies can be occupied by this larger number of cations. Preferably a part of the alkaline-earth cations (AE) ions is replaced by alkali ions (AK). Thus a part of the Mg, Ba, Ca, and/or Sr is replaced by Li, Na, K or Rb ions. In another modification a part of the silicon cations (Si) is replaced by III-element ions (TE), i.e. by elements of the third column of the periodic system of elements and thus by Al, Ga or In ions.

In a further preferred embodiment the suitable elements form anions for replacement of nitrogen anions and having a larger negative charge than the nitrogen ions that they replace. In this way also anion vacancies are created that can annihilate the cation vacancies formed by excess oxygen on the nitrogen sublattice. Similarly, the formation of an interstitial oxygen defect will be avoided since the created anion vacancy can be occupied by an oxygen atom that otherwise could form an interstitial. An example of this creation of an anion vacancy is formed by replacing a part of the nitrogen ions (N) by carbon ions (C).

Preferably the creation of vacancies is substantially completely prevented by the incorporation of appropriate amounts of the further elements in the phosphor. For this reason an advantageous modification is characterized in that in order to determine the suitable amount of further elements the oxygen content in the starting compounds and/or the amount of oxygen introduced during the reaction process are determined.

In a preferred modification, the amount of oxygen within the inventive phosphor can be minimized by obviating nitrates, carbonates, oxalates, acetates, or the like as starting materials. Only residual oxygen present e.g. in technically available nitrides will be present in the resulting phosphor.

In a further modification for the compounds solid compounds are chosen that are grinded and mixed and heated in a furnace under an ambient that is free or at least substantially free of oxygen. Apart from (substantially) oxygen free, such an ambient may be even reducing such as an ambient comprising a mixture of nitrogen and hydrogen. Although other manufacturing methods, like using the MOVPE or MOVPD (=Metal Organic Vapor Phase Epitaxy/Deposition) or the so-called Sol-Gel technique, the method of this solid-state synthesis embodiment implies several important advantages. The heating may be done e.g. in the temperature range of 1200 to 1700 degrees Celsius and preferably between 1300 and 1600 degrees Celsius for the above solid state synthesis method.

In a preferred modification for the compounds used in forming the phosphor only compounds are selected that do not contain intentionally added oxygen. In this way the oxygen compound in the modified phosphor is as low as possible. The modified phosphor compound in this case has a formula that is as close as possible to e.g. $AE_2Si_5N_8$:RE.

The invention further comprises a modified rare-earth doped alkaline-earth silicon nitride phosphor ($AE_2Si_5N_8$:RE) obtainable by a method according to the invention. In a preferred embodiment the composition of the phosphor is as $AE_{2-x}AK_xSi_5N_{8-x}O_x$:RE, wherein x is smaller than 1, preferably substantially smaller than 1, although larger than zero. Very suitable values for the oxygen mol fraction x are smaller than 0.25 and a most preferred range for the oxygen content lies between 0 and 0.1.

Another attractive phosphor obeys $AE_2Si_{5-x}N_{8-x}TE_xO_x$:RE, wherein x is preferably smaller than 1 and preferably smaller than 0.25 and more preferably between 0 and 0.1.

A further preferred composition obeys $AE_2Si_5N_{8-2x}C_xO_x$:RE, wherein again x is smaller than 1, more preferably smaller than 0.25 and more preferably between 0 and 0.1. The symbols AE, AK, RE and TE have the same meaning as indicated before. It is to be noted that also phosphors can be obtained, which form a mixture of the above mixed crystals. Thus substitution may simultaneously occur at both the AE sublattice as on the silicon lattice as on the nitrogen sublattice.

In the case of substituting the nitrogen ions in the anionic sublattice by negative charged carbon ions another aspect should be regarded. Besides the effect of compensating vacancies the incorporation of carbon ions ($C^{4-}$) in the nitride anion sublattice can have further positive effects on the phosphor properties e.g. on phosphor stability against degradation. These further effects would be due to the stronger covalent Si—C bonding compared to the Si—N bonding. The incorporation of C in a nitride lattice and the formation of a Si—C bonding are already known for carbidonitridosilicate compounds like $Re_2Si_4N_6C$. Therefore, it can be favourable to add more SiC as it is necessary for the compensation of the determined and calculated oxygen amount. In that case further charge compensating elements like (1−) charged anions X (e.g. halogen ions like $F^-$), (3+) charged cations M (e.g. $La^{3+}$, $Sc^{3+}$, $Y^{3+}$ or other (3+) charged rare-earth ions) and/or (5+) charged cations (e.g. $P^{5+}$, $Ta^{5+}$, $V^{5+}$) have to be incorporated by substitution of $N^{3-}$ anions, alkaline-earth ions and silicon ions, respectively resulting in phosphor compositions which obey for example the formulas

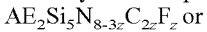
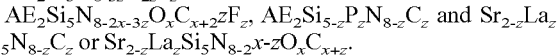

$AE_2Si_5N_{8-3z}C_{2z}F_z$ or
$AE_2Si_5N_{8-2x-3z}O_xC_{x+2z}F_z$, $AE_2Si_{5-z}P_zN_{8-z}C_z$ and $Sr_{2-z}La_zSi_5N_{8-z}C_z$ or $Sr_{2-z}La_zSi_5N_{8-2x-z}O_xC_{x+z}$.

Finally the invention comprises a radiation converting device for the transformation of UV, purple and blue radiation into yellow-orange-red light containing a modified rare-earth doped alkaline-earth silicon nitride phosphor ($AE_2Si_5N_8$:RE) obtainable with a method according to the invention. For example, as relevant technical devices, fluorescent lamps, coloured light or white emitting LED's, special Scanning Beam Displays based on UV or purple laser excitation and also photovoltaic cells as well as greenhouse foils and glasses can be regarded. However, the invention is not limited to those examples.

It is to be noted here that the notation chosen to represent the rare-earth doping, i.e. "formula: RE", is chosen for reasons of simplicity and for expressing that the RE element forms a doping element and may be present in a relatively small quantity. However, in the present invention also oxygen and the suitable substitution elements are present in relatively low concentrations in the mixed crystal of the phosphor compound. Thus, also a representation by "formula" in which the RE element is represented and handled in the same manner as the other constituents (AE, Si, N, O) of the phosphor compound is feasible. In fact the RE element may be present also in high quantity relative to the AE element up to even a 100 percent replacement of the AE element by the RE element.

DESCRIPTION OF EMBODIMENTS

It is further to be noted that silicon nitride based materials can be prepared in different ways, e.g. solid state synthesis starting from the nitrides, nitridation of elemental starting materials or carbothermal reduction and nitridation of oxide starting materials. Ammonolysis of oxide based starting materials, comprising the heating in $NH_3$ containing atmosphere, is also a possible route. The solid-state synthesis method is normally used to prepare the $M_2Si_5N_8$:Eu phosphor material starting from (nitrided) Eu and M (alkaline earth) metals together with $Si_3N_4$.

For example, the preparation of $Eu^{2+}$ doped $M_2Si_5N_8$ (M=Ba, Sr, Ca) can be as follows. The binary nitride precursors $SrN_a$ (a≈0.6-0.66), $BaN_b$ (b≈0.6-0.66) and $EuN_c$ (c≈0.94) can be pre-prepared by the reaction of the pure strontium metal, barium metal and Eu metal under flowing dried nitrogen at 800, 550, and 800° C., respectively, for 8-16 hours. In addition, calcium nitride powder $Ca_3N_2$ and α-$Si_3N_4$ powder can be used as the as-received raw materials. Polycrystalline $M_{2-y}Eu_ySi_5N_8$ (0≤y≤0.2 for M=Ca, 0≤y≤2.0 for M=Sr, Ba) powders can be prepared by a solid state reaction method at moderately high temperature. The $Ca_3N_2$, $SrN_a$, $BaN_b$ and $EuN_c$ as well as α-$Si_3N_4$ powders are weighed out in the appropriate amounts and subsequently mixed and ground together in an agate mortar. The powder mixtures are then transferred into e.g. molybdenum crucibles. All processes are carried out in a purified-nitrogen-filled glove-box. Subsequently those powder mixtures are fired twice (with a medium grinding in between) in a horizontal tube furnace at 1300-1400° C. for 12 and 16 hours, respectively, under flowing 90% $N_2$-10% $H_2$ atmosphere.

An inventive phosphor, obtainable by a method of manufacturing according to the present invention, of high efficiency is given by the formula $(Sr,Eu)_2Si_{5-x}Al_xN_{8-x}O_x$. In order to prevent formation of defects which may be detrimental for the luminescence behavior, each unit cell contains a compound (formula unit) with composition $(Sr+Eu)_2(Si+Al)_5(N+O)_8$. The ideal relation between (Sr+Eu), (Si+Al), and (N+O) is 2:5:8 because there are present two sites for large metal ions (Sr,Eu), five cation sites for tetrahedrally coordinated ions (Si,Al) and eight anion sites (N,O) per formula unit. Other deviating compositions in unit cells like $Sr_2Si_5N_{(8-x)}O_{(3/2x)}$ are avoided by taking residual oxygen into account. The phosphor $(Sr,Eu)_2Si_{5-x}Al_xN_{8-x}O_x$ shows oxygen preferably in a very small amount i.e., 0<x<1 and more preferably it holds that 0<x<0.1. The preparation of such a phosphor can be achieved e.g., by adding aluminum nitride in the same molar amounts as oxygen present in $Si_3N_4$, the fact that oxygen is present on the nitrogen site can be balanced by the presence of aluminum on the silicon site. Most unit cells contain $Sr_2Si_5N_8$ units, while only some of them contain $Sr_2Si_4AlN_7O$ units.

A description is given for the solid-state synthesis route of silicon nitride based materials starting with $Si_3N_4$ as starting material. Different options to compensate the oxygen present in the starting material $Si_3N_4$ (that means that actually $SiO_2$ is present) for e.g. $Sr_2Si_5N_8$:Eu are:

1. With $Al^{3+}$ (e.g. by the addition of AlN)

Due to the replacement of a $(SiN)^+$ pair by an equally charged $(AlO)^+$ pair, the overall stoichiometry of the host-lattice is maintained, and no defects like vacancies are formed. This can be achieved by adding AlN to the reaction mixture in the amount required to consume the oxygen present in the starting $Si_3N_4$ material (as $SiO_2$) according to the reaction equation: $SiO_2+2AlN \rightarrow SiAl_2N_2O_2$, resulting in a compound with the same stoichiometry as the "ideal" $Si_3N_4$ material (without oxygen). Note that the residual oxygen content in the practically available aluminum nitride has to be taken into account, too. An example of the resulting phosphor is $(Sr,Eu)_2Si_{5-x}Al_xN_{8-x}O_x$.

2. With $C^{4-}$ (e.g. by the addition of SiC)

Due to the replacement of a $(OC)^{6-}$ pair by an equally charged $(N_2)^{6-}$ pair, the overall stoichiometry of the host-lattice is maintained, and no defects (like vacancies or interstitials) are formed. This can be achieved by adding SiC to the reaction mixture in the amount required to consume the oxygen present in the starting $Si_3N_4$ material (as $SiO_2$) according to the reaction equation: $SiO_2+2SiC \rightarrow Si_3C_2O_2$, resulting in a compound with the same stoichiometry as the "ideal" $Si_3N_4$ material (without oxygen). An example of the resulting phosphor is $(Sr,Eu)_2Si_5N_{8-2x}O_xC_x$.

3. With $Na^+$ (e.g. by the addition of $Na_2O$ in the form of $Na_2CO_3$ of which carbondioxide is released during synthesis). Due to the replacement of a $(AEN)^-$ pair by an equally charged $(NaO)^-$ pair, the overall stoichiometry of the host-lattice is maintained, and no defects (like vacancies or interstitials) are formed. This can be achieved by adding $Na_2O$ ($Na_2CO_3$) to the reaction mixture in the amount required to consume the oxygen present in the starting $Si_3N_4$ material (as $SiO_2$) according to the reaction equation: $SiO_2+2Na_2O+3Si_3N_4 \rightarrow 2Na_2Si_5N_6O_2$, resulting in a compound with the same stoichiometry as the "ideal" $Sr_2Si_5N_8$ material (without oxygen). An example of the resulting phosphor is $(Sr,Eu)_{2-x}Na_xSi_5N_{8-x}O_x$.

The proposed idea not only can be used for the compensation of oxygen present in $Si_3N_4$, but also in the starting materials containing Sr and Eu. The proposed idea makes it possible to use relatively small quantities of (cheaper and more convenient) oxide starting materials, like SrO ($SrCO_3$) and $Eu_2O_3$.

The synthesis conditions concerning mixing procedure, firing temperature and atmosphere as well as further properties, aspects, and advantages of the invention will be discussed in more detail below with reference to three examples with various oxygen contents. Starting materials are $Si_3N_4$ (either α or β), $SrN_a$ (or nitrided Sr) and/or small quantities of SrO (or $SrCO_3$) and $EuN_c$ (or nitrided Eu) and/or small quantities of $Eu_2O_3$, while AlN or SiC is added for charge compensating the residual amounts of oxygen (e.g. present in $Si_3N_4$) or the intentionally added amounts of oxygen (e.g. as SrO or $Eu_2O_3$).

Example 1

230 g α-$Si_3N_4$ (oxygen content 0.6 wt %), 3.64 g SiC, 6.08 g Eu (which is nitrided in $N_2$ atmosphere at 800° C.) and 172 g Sr (which is nitrided in $N_2$ atmosphere at 800° C.) are subsequently mixed under dry nitrogen atmosphere. That mixture is filled into thermal and chemical stable crucibles and fired in a $N_2/H_2$ atmosphere at 1350-1600° C. for 8-24 h. The resulting phosphor can be represented by the following formula:

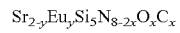

wherein x=0.086 and y=0.04.

Example 2

A mixture of 225 g α-$Si_3N_4$ (oxygen content 1.5 wt. %), 8.66 g AlN, 6.08 g Eu (which is again nitrided in $N_2$ atmosphere at 800° C.) and 172 g Sr (which is also again nitrided in $N_2$ atmosphere at 800° C.) is prepared and fired in the same way as it is described in example 1. The resulting phosphor can be represented by the following formula:

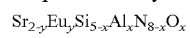

wherein x=0.211 and y=0.04.

Example 3

A mixture of 218 g α-$Si_3N_4$ (oxygen content 1.0 wt. %), 15.05 g SiC, 26.39 g $Eu_2O_3$ and 162 g Sr (which is nitrided in $N_2$ atmosphere at 800° C.)) is prepared and fired in the same way as it is described in example 1. The resulting phosphor can be represented by the following formula:

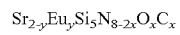

wherein x=0.361 and y=0.15.

The invention was described above with reference to preferred embodiments thereof. Those skilled in the art will appreciate that numerous modifications may be applied thereto without departing from the scope of the accompanying claims. The description should accordingly be regarded as illustrative rather than restrictive, and no limitations are to be inferred other than those stated in the claims.

Although the invention is particularly suitable for a phosphor made by grinding and heating, it can be also applied in other manufacturing methods such as those mentioned above like MOVPE. In the method use can be made of fluxes or additives for influencing particle size and/or particle morphology.

Instead of doping with a single rare-earth ion, doping with more than one of such ions, e.g. Eu and Ce, may be considered. Also co-doping or co-activation with transition metal ions is feasible.

Further it is to be noted that in the examples Sr can be partly or completely be replaced by Mg or Ca or Ba or the like or by a combination of such elements. In this respect it is to be noted that the alkaline-earth elements may be partly replaced by other suitable metallic ions with a 2+ charge like in particular Zn-ion.

Although the invention in particular aims at the manufacture of a modified alkaline-earth silicon nitride phosphor with a composition close to $AE_2Si_5N_8$:RE it may equally well be applied to the preparation of other modified alkaline-earth silicon nitride phosphor compounds with a composition close to other known compounds of the elements AE, Si and N. Examples of the latter are $AESi_7N_{10}$ or $AESiN_2$. The invention equally deals with the corresponding obtainable phosphor compounds in which suitable substitutions are performed and with a radiation converting device comprising the latter.

Other excitation methods may be used than the one mentioned, e.g. Cathode-ray or X-ray excitation, electro-luminescence etc. Other forms than powders may be used for the compound used in the method according the invention e.g. monocrystals, thin films, ceramics (a sintered powder), and co-coating in which the compound is formed on a nucleus of another material or in which the compound is coated by another material.

Finally it is also to be noted that although the method according to the invention preferably implies the formation of the desired phosphor compound using a synthesis based on two or more compounds, it also comprises the method in which one compound that has been already made according to the composition of a desired phosphor is treated with a (or several) further compound in order to remove defects and/or segregation in the phosphor by forming a modified compound in which defects are removed by creating, filling or annihilating vacancies.

The invention claimed is:

1. A method of manufacturing a rare-earth doped alkaline-earth silicon nitride phosphor, said method comprising the steps of:
    selecting one or more compounds each comprising the groups consisting of the rare-earths elements, the alkaline-earth elements, silicon and nitrogen wherein together the selections comprise necessary elements to form a rare-earth doped alkaline-earth silicon nitride phosphor;
    bringing the one or more compounds to an elevated temperature in between 1,200 and 1,700 degrees Celsius in reaction for forming the rare-earth doped alkaline-earth silicon nitride phosphor, wherein an amount of oxygen is being incorporated in the rare-earth doped alkaline-earth silicon nitride phosphor thus formed;
    partly substituting nitrogen anions of the alkaline-earth silicon nitride phosphor for carbon by which vacancies are created, filled or annihilated within the lattice of the phosphor resulting in the formation of a modified alkaline-earth silicon nitride phosphor having a stoichiometric composition so as to at least partly prevent the creation of defects by formation of a non-stoichiometric oxygen-containing alkaline-earth silicon nitride phosphor, wherein the resulting rare-earth doped alkaline-earth silicon nitride phosphor is characterized by a general formula of:

$$AE_2Si_5N_{8-2x}C_xO_x:RE$$

wherein AE is an alkaline-earth element;
    RE is a rare earth element;
    and wherein x is smaller than 1;
    determining a suitable amount of carbon to substitute by determining an oxygen content in the starting material or the amount of oxygen introduced during the reaction; and
    incorporating the suitable amount of carbon in the phosphor to prevent defect creation.

2. The method according to claim 1, further comprising the step of selecting, for the compounds, only compounds that do not contain oxygen that has been intentionally-added.

3. A modified rare-earth doped alkaline-earth silicon nitride phosphor obtainable by a method according to claim 1.

4. The modified rare-earth doped alkaline-earth silicon nitride phosphor as claimed in claim 3 wherein x is smaller than 0.25.

5. A radiation-emitting device comprising a modified rare-earth doped alkaline-earth silicon nitride phosphor as claimed in claim 3.

6. A radiation-converting device comprising a modified rare-earth doped alkaline-earth silicon nitride phosphor as claimed in claim 3.

7. A radiation-emitting device comprising a modified rare-earth doped alkaline-earth silicon nitride phosphor as claimed in claim 4.

8. A radiation-converting device comprising a modified rare-earth doped alkaline-earth silicon nitride phosphor as claimed in claim 4.

9. A modified rare-earth doped alkaline-earth silicon nitride phosphor as claimed in claim 4 wherein x is smaller than 0.1.

10. The method according to claim 1, further comprising choosing for the compounds solid compounds and preparing the solid compounds by grinding, mixing, and heating the solid compounds in a furnace under a reducing atmosphere.

11. The method according to claim 1, further comprising choosing for the compounds solid compounds and preparing the solid compounds by grinding, mixing, and heating the solid compounds in a furnace under an atmosphere.

12. A modified rare-earth doped alkaline-earth silicon nitride phosphor obtainable by a method according to claim 10.

13. A modified rare-earth doped alkaline-earth silicon nitride phosphor obtainable by a method according to claim 11.

14. A modified rare-earth doped alkaline-earth silicon nitride phosphor obtainable by a method according to claim 2.

* * * * *